United States Patent Office 3,326,882
Patented June 20, 1967

3,326,882
HIGH PRESSURE ETHYLENE POLYMERIZATION
Roland J. Kern, Miamisburg, Lowell E. Erbaugh, Vandalia, and John D. Calfee, Dayton, Ohio, assignors to Monsanto Company, a corporation of Delaware
No Drawing. Filed Apr. 20, 1959, Ser. No. 807,312
1 Claim. (Cl. 260—94.9)

The present invention is directed to the high pressure preparation of polymers of ethylene by use of a trialkyl borane and oxygen catalyst under high pressure, and to polymers of ethylene characterized by high density and linearity and a very low degree of residual unsaturation.

It has been previously known to polymerize ethylene in the presence of trialkyl boranes. However, the previous work did not recognize the marked advantage obtainable by adding oxygen, oxygen gases or oxygen generating materials in high pressure polymerization with trialkyl boranes in order to accelerate polymerization rates and obtain high density polyethylene resembling that obtained by low pressure polymerization but having important differences therefrom.

In one important aspect of the invention, the oxygen is introduced into the reactor containing trialkyl borane and ethylene at high pressure, the reaction being controlled and the efficiency of the catalyst being improved by this procedure. In addition, it is convenient to be able to add the catalyst components separately and have the active catalyst formed in situ, thus avoiding the problem of handling and preserving the activity of an unstable catalyst. In addition, the continued addition of oxygen is effective in maintaining a catalyst of uniform activity throughout the reaction period.

The polymerization procedure of the present invention has a number of other important advantages. The polymerization can be initiated and carried out at low temperatures, e.g., those not over about 100° C. or so and very good results are obtained at 0° C., and good results are obtained at even lower temperatures. An additional advantage is the fact that no difficultly removable catalyst residues are formed in the polymerization and acceptable polyethylene can be readily isolated from the polymerization mixture. Moreover, in the case of tubular reactors, the feasibility of adding the oxygen catalyst separately has advantages in avoiding undesirable deposits in the inlet end of the reactor, i.e., in maintaining "front-end" reactor cleanliness.

It will be understood that the reaction can be controlled by an alternative method involving the use of small amounts of trialkyl borane as catalyst in combination with the oxygen, the amounts being so small that the heat of reaction can be readily dissipated as the low concentration of trialkyl borane prevents the simultaneous reaction of large amounts of ethylene; however, aside from the undesirably low reaction rate and other difficulties, it would then be necessary to add additional increments of trialkyl borane catalyst as the reaction proceeded toward completion. It will readily be appreciated, in view of the present invention, that a much more preferable method of control is to effectively regulate the concentration of the active catalyst by keeping the concentration of oxygen dilute at all times, in particular by adding the oxygen only when high concentrations of ethylene, e.g., more than 10,000 p.s.i., are already present; however, the procedure of adding the trialkyl borane to an ethylene and oxygen mixture at pressures above 10,000 p.s.i., can also be employed.

As the trialkyl borane component employed in the present process, any trialkyl borane is contemplated as applicable, particularly those in which the alkyl groups have 1 to 10 or more carbon atoms and have a normal or forked chain, or cyclic structures. While trialkyl boranes in which all of the alkyl groups are the same will ordinarily be employed for convenience, those containing two or three different alkyls are also suitable, as are mixtures of two or more different trialkyl boranes. A few of the specific boranes which are suitable are, for example, triethylborane, trimethylborane, tri-n-propylborane, triisopropylborane, tri-n-butylborane, tri-n-hexylborane, tri-n-octylborane, butyldiethylborane, tricyclohexylborane, etc.

The oxygen catalyst component employed in the present invention will generally be free oxygen, oxygen in air or oxygen in admixture with other gases, or with ethylene; however, it is possible and sometimes advantageous to employ other oxygen containing or oxygen generating compounds. The oxygen or peroxygen compounds suitable as oxygen components of the initiator employed in the present invention, are, for example, oxygen, either added as such or generated in situ by addition of oxygen generating compounds and including oxygen added as a component of gases such as air, and peroxygen compounds, particularly organic peroxygen compounds, capable of generating free radicals when heated below 200° C. such as hydrogen peroxide, dicumyl peroxide, benzoyl peroxide, lauroyl peroxide, diethyl peroxide, ditertiarybutyl peroxide, diisopropyl peroxide, hydroxymethyl hydroperoxide, tertiarybutyl hydroperoxide, ethyl hydroperoxide, acetoperacid, benzoperacid, succinic monoperacid, phthalic peracid, trimethylacetoperacid, ethyl percamphorate, ethyl perbenzoate, tertiary-butyl perbenzoate, etc., and any other peroxide or peroxygen compounds capable of employment as free radical polymerization catalysts. While the description herein will be primarily directed, to use of oxygen itself as a catalyst component, it will be realized that the description is pertinent to the oxygen components in general, it only being necessary for the most part to substitute equimolar amounts of organic or other peroxygen compound for oxygen in any procedure.

It will be realized that the trialkyl boranes in combination with oxygen or peroxygen compounds are effective initiators for polymerization of ethylene without the necessity for any other metal salts or compounds and that the presence of other metal salts such as $TiCl_4$ and the like while permissible, is not required and in some cases, might even be deleterious to the free radical catalyzed polymerization; i.e., in one preferred embodiment, it is contemplated that a trialkyl borane be the sole metal compound employed in the polymerization.

The polymerizations according to the present invention can be effected at relatively low polymerization temperatures, such as room temperature or the like, thereby avoiding the necessity of heating the reactants with possible deleterious effects on the properties of the resulting polymers. Thus the polymerization can suitably be effected at temperatures of about —100° C. to 100° C., to produce polymers characterized by properties resulting from low temperature polymerization, temperatures of about 0° C. to 50° C. being particularly suitable. Controlling the temperature provides a method of controlling density of the resulting polymer as the density bears an inverse relationship to polymerization temperature. If desired, however, polymerizations can be effected at higher temperatures, up to 150° C. or even 250° C. or so, employing the trialkyl boranes with addition of oxygen or peroxides as disclosed herein.

In one of its most important aspects the present invention can be considered as a method of effecting the low temperature, oxygen catalyzed, high pressure polymerization of ethylene. Under ordinary conditions oxygen will not cause substantial initiation of ethylene polymerization except at temperatures above about 150° C. The present invention by the use of both a trialkyl borane and oxygen provides a method of carrying out the polymerization at a much lower temperature, for example, having substantially the entire polymerization occur below about 100° C., or even below about 50° C.

Regulating the rate of addition of the oxygen is an effective control method. Thus, in the presence of sufficient amounts of a trialkyl borane to effect a rapid, uncontrolled polymerization of ethylene if amounts of oxygen equimolar with the trialkyl borane were immediately added, it is possible to so control the oxygen addition as to effect an efficient, reasonably rapid conversion of the ethylene to polyethylene, without adding so much oxygen as to make it impossible to dissipate the heat of the exothermic polymerization thereby causing undue rises in the reaction temperature and resulting deterioration or carbonation of the product. For example, the oxygen can be added at a rate sufficient to avoid temperatures in excess of 100° C. for any substantial part of the polymerization cycle. The controlled addition of oxygen will be especially advantageous when relatively high amounts of trialkyl boranes are employed; while the effectiveness of heat transfer systems and other factors will have a considerable influence upon the trialkyl borane concentrations for which carefully controlled oxygen addition is necessary, the use of controlled addition will ordinarily be advantageous for polymerizations in which the amount of trialkyl borane exceeds about 10 millimoles/1000 grams of ethylene monomer. The regulated addition of oxygen also provides a precise control of polymerization temperature, making it possible to conduct almost the entire polymerization, within a few degrees of a particular temperature, for example, 0° C., with consequent uniformity of product.

While the regulated addition of oxygen is the preferred procedure, it is also possible to control the polymerization by regulated addition of trialkyl borane to an ethylene and oxygen mixture.

With the present method of controlling the polymerization it is not necessary to employ a chain transfer agent, such as an alkane of 3 to 6 carbon atoms or the like, to control the polymerization, but use of such agents may have certain advantages, particularly at lower temperatures, and their use will be discussed more fully hereinbelow.

The polymerization of the present invention can occur in bulk, in aqueous or non-aqueous emulsion, or in solution in hydrocarbon or other organic solvents and the like, and can also occur in gaseous or vapor phase.

The amounts of oxygen or peroxygen catalyst can vary considerably; for example, the total amounts of oxygen can be in a range from about 5 parts by weight to 50 or so parts by weight, based on a million parts by weight of ethylene. To obtain the maximum benefits from delayed addition of oxygen, it is desireable that the ethylene as charged contain less than 5 weight parts per million of oxygen, and the delayed oxygen addition can suitably be effected by adding oxygen in ethylene or other medium comprising more than 500 weight parts per million of oxygen.

It is advantageous to add at least about one-half of the total amount of oxygen catalyst employed added after the pressure has been raised to 10,000 p.s.i. or greater, and preferably at least about three-fourths of the oxygen catalyst added after such pressures have been attained.

The oxygen or peroxygen catalysts are suitably employed in amounts which are approximately equimolar with the trialkyl boranes. Smaller amounts from a trace or more of oxygen are effective to some extent, but conversion rates are undesireably slow; amounts of oxygen substantially greater than equimolar are also effective, but there is some loss of catalyst activity with the use of excess oxygen. Amounts of oxygen from about 0.5 to 1.5 moles/mole of trialkyl borane will ordinarily be effective, and in some cases, amounts to from 0.1 mole to 2.0 moles per mole of trialkyl borane will be employed.

The mechanism by which trialkyl boranes and oxygen catalyze the polymerization of ethylene is not certain. However, it may be that the trialkyl boranes serve as a low temperature initiator to trigger the oxygen catalyst, and that it is advantageous to have sufficient ethylene present when the oxygen catalyst and trialkyl borane come into contact so that the catalyst components are not unduly expended in reacting together, but will rather be efficiently utilized in effecting the polymerization of ethylene.

Broadly the amounts of trialkylborane can vary, for example, from a trace or about .01% to 2% by weight of the ethylene, or higher amounts up to 5% or even 15% or more by weight of the ethylene can be employed.

The invention is illustrated by the following examples in which for sake of convenience triethylborane is employed as an exemplification of trialkyl boranes.

Example 1

Triethylborane, about 0.08 cc. and 10 grams of benzene were charged to a 250 cc. autoclave which was then heated to 40° C. and pressured to 15,000 p.s.i. with ethylene. Then ethylene containing 0.1% by weight oxygen was pumped in until a presure of 25,000 p.s.i. was attained, while the internal reactor temperature was maintained at about 40° C., and additional ethylene containing oxygen was added as necessary to maintain the pressure during the polymerization. The total amount of oxygen employed was about 6 millimoles/1000 grams ethylene. A number of hours after the addition of the oxygen, and ethylene pressure was released, and the resulting solid polymer, 32 grams in amount, was removed.

It will be understood that the oxygen can be added in separate increments at various stages of the reaction, or that it can be added at a continuous gradual rate to achieve the desired polymerization rate. In the case of tubular reactors it may be advantageous to add oxygen catalyst at one or more points along the course of flow in place of or in addition to adding oxygen at the inlet end.

Example 2

Benzene, 10 grams, and 0.1 cc. triethylborane were charged to a 250 ml. reactor which was then pressured to 25,000 p.s.i. with ethylene containing 3.6 millimoles oxygen/1000 grams ethylene. The reactor temperature rose from 40 to about 100° C. during the resulting polymerization. The solid polyethylene containing product was removed, milled at about 180° C. to remove residual solvent and monomer, molded and the properties determined as follows:

| | |
|---|---|
| Density | 0.94 |
| Tensile strength at yield, p.s.i. (15% elongation) | 4000 |
| Tensile strength at break p.s.i. (55% elongation) | 4700 |
| Molecular weight ($M_w$) | 200,000 |
| Molecular weight ($M_n$) | 160,000 |
| $M_w/M_n$ | 1.2 |
| Crystallinity by X-ray diffraction, percent | 44 |
| $CH_3/100C$ | 0.55 |
| Unsaturation | not measurable. |

It will be seen from the above data that even though the polyethylene was prepared by a high pressure process, it approaches Ziegler polyethylene in density and also the 0.55 ratio of methyl groups per 100 carbon atoms determined from infrared date is comparable to the low branched, Ziegler polymers. Additional evidence of the linearity of the polyethylene is the tensile strength at yield of 4000 p.s.i., as compared to tensile strengths such as 1400 p.s.i. for commercial high pressure polyethylenes. A particularly striking feature of the novel polyethylene is the absence of any measureable amount of unsaturation as determined by infrared date; the substantially complete saturation has advantages with respect to stability and high temperature properties. Moreover, the low $M_w/M_n$ (ratio of the weight average molecular weight as determined by viscosity measurements to the number average molecular weight determined by osmotic pressure measurements) indicates a narrow molecular weight distribution, which has an important advantage with respect to such properties as the relationship of impact strength properties to flow properties. The fact that clear films were molded from the polymer further indicates the advantage of the narrow molecular weight distribution.

The polymer of the present invention is not only believed to be the first polymer prepared by homogeneous catalysis, so linear as to have chain branching no greater than $0.6CH_3/100C$, but considered as a novel polyethylene distinguishable from all other polyethylenes by its substantially complete saturation, chain branching no greater than $0.6CH_3/100C$, density greater than 0.935, tensile strength at yield greater than 3000 p.s.i., and $M_w/M_n$ of less than 2. While the molecular weight $(M_w)$ of the polyethylene can be varied considerably, the most useful ranges will probably be from less than about 100,000 up to about 300,000 or more, but ranges will also be useful even up to 500,000 or 1,000,000 or more.

While pressures around 25,000 p.s.i., are very suitable for use in the present invention, superatmospheric pressures, particularly for example, from 10,000 to 50,000 p.s.i., or even up to 100,000 or 200,000 p.s.i. or greater can be employed effectively.

*Example 3*

A 250 ml. reactor was charged with 0.4 cc. triethylborane 10 grams benzene and pressured to 25,000 p.s.i. with ethylene containing 12.8 millimoles oxygen/1000 grams ethylene. The resulting polymerization caused the internal temperature to rapidly go from the jacket temperature of 40° C. to carbonization temperatures and caused the reactants to be carbonized.

*Example 4*

In a procedure similar to that of Example 3, ethylene was polymerized in the presence of catalyst comprised of 3.3 millimoles triethylborane and 3.0 millimoles benzoyl peroxide, per 1000 grams ethylene. The polymerization occured at about 40° C. and 25,000 p.s.i., with hexane as solvent medium, to give 19 grams of polyethylene; the benzoyl peroxide was in a sealed vial isolated from the other reaction components until the stated pressure was attained.

*Example 5*

Ethylene was polymerized at 25,000 p.s.i. and 40° C. with 3.6 millimoles triethylborane and 4.4 millimoles hydrogen peroxide in a 250 cc. reactor, which also contained 80 grams water and 10 grams hexane, to obtain about 17 grams polyethylene of good properties. The hydrogen peroxide was in a sealed vial isolated from the other reaction components until the stated pressure was attained.

*Example 6*

In a procedure similar to Example 2 but employing 10 grams of cyclopentane as solvent in the charge, and employing 3.7 millimoles triethylborane and 3.8 millimoles oxygen per 1000 grams ethylene, the oxygen was added in admixture with ethylene at 20,000 p.s.i., and the polymerization was effected at 0° C. to give a relatively high yield of polyethylene.

While the invention is particularly concerned with homopolymerization of ethylene, it is also contemplated to utilize small amounts of copolymerizable monomers along with the ethylene in preparing polymers of ethylene according to the present invention.

While the foregoing illustrations are in the main concerned with batch polymerization, it is possible to conduct similar continuous polymerizations in similar reactor or in highly elongated tubes, i.e., tubular reactors, by making suitable modifications as necessary. In the continuous polymerization, the present invention can be employed in tubular reactors along with the flow impulse feature, chain transfer agents and conditions described in the copending application of John D. Calfee, William R. Richard, Jr., Wallace G. Bir and Norval E. Jones, S.N. 712,339 filed on Jan. 31, 1958, and with similar features in U.S. Patent 2,852,501 to William R. Richard, Jr., Robert K. Stewart, and John D. Calfee, assignors to Monsanto Chemical Company, issued Sept. 16, 1958, and the present invention can also be employed in conjunction with the oxygen catalyst compositions described in copending application S.N. 797,350, filed March 5, 1959 and now U.S. Patent 3,142,666, of Oliver DeS. Deex, Lowell E. Erbaugh, and John M. Butler. When employing continuous procedures it will probably be desirable to have sufficient trialkylborane present and to add oxygen at a rate sufficient to effect 10 to 20% by weight conversion of ethylene to polyethylene per minute.

When polymers formed according to the present invention will be useful in general for molding resins and for the purpose for which Ziegler and high pressure polyethylene are suited, and will also have certain specialized uses in high temperature and electrical insulation applications for which it is especially suited; the polymers will be useful in the formation of transparent films for wrappings and other purposes.

We claim:

The method of preparing polyethylene which comprises polymerizing ethylene in the presence of triethyl borane at pressures of at least 10,000 p.s.i., by the addition of oxygen catalyst as a promoter, the polymerization temperature not being in excess of 100° C. for any substantial part of the polymerization.

References Cited

UNITED STATES PATENTS

| 2,685,575 | 8/1954 | Heiligmann | 260—83.7 |
| 2,882,264 | 4/1959 | Barnes et al. | 260—94.9 |
| 2,985,633 | 5/1961 | Welch | 260—94.9 |

OTHER REFERENCES

Furukawa et al.—I: Journal of Polymer Science, volume 26, pages 234–236, November 1957.

Furukawa et al.—II: Journal of Polymer Science, volume 28, pages 227 and 228, February 1958.

JOSEPH L. SCHOFER, *Primary Examiner.*

L. H. GASTON, M. LIEBMAN, J. R. LIBERMAN, J. C. LAPRADE, S. ASTOR, M. B. KURTZMAN,
*Assistant Examiners.*